United States Patent
Willig

(10) Patent No.: US 6,952,414 B1
(45) Date of Patent: Oct. 4, 2005

(54) PORTABLE INTERNET BROWSER DEVICE WITH CORDLESS PHONE MODULE AND METHOD OF OPERATION

(75) Inventor: Randy C. Willig, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 812 days.

(21) Appl. No.: 09/669,709

(22) Filed: Sep. 26, 2000

(51) Int. Cl.[7] .............................................. H04L 12/50
(52) U.S. Cl. .............. 370/352; 379/93.09; 379/110.01; 345/650; 345/169
(58) Field of Search ................................ 370/352, 353, 370/354, 355; 379/88.11, 90.01, 90.02, 92.04, 379/93.05, 100.05, 100.15, 93.09, 102.02, 379/110.01, 201.04; 345/650, 168, 169, 179–182, 345/520, 1.1, 2.1

(56) References Cited

U.S. PATENT DOCUMENTS

| | | | | |
|---|---|---|---|---|
| 5,983,073 | A | * | 11/1999 | Ditzik ........................ 455/11.1 |
| 6,112,099 | A | * | 8/2000 | Ketola ........................ 455/466 |
| 6,359,892 | B1 | * | 3/2002 | Szlam ........................ 370/401 |
| 6,418,146 | B1 | * | 7/2002 | Miloslavsky ................ 370/400 |
| 6,477,565 | B1 | * | 11/2002 | Daswani et al. ............ 709/217 |
| 6,487,602 | B1 | * | 11/2002 | Thakker ...................... 709/230 |
| 6,587,433 | B1 | * | 7/2003 | Borella et al. ............... 370/230 |
| 6,757,551 | B2 | * | 6/2004 | Newman et al. ......... 455/556.1 |
| 2002/0022499 | A1 | * | 2/2002 | Newman et al. ............ 455/556 |

OTHER PUBLICATIONS

W. Richard Stevens, TCP/IP Illustrated: The Protocols, 1994, Addison-Wesley, vol. I, pp. 34-35.*
U.S. Appl. No. 09/443,024, filed Nov. 1999, Newman et al.*

* cited by examiner

Primary Examiner—Wellington Chin
Assistant Examiner—Mark A Mais

(57) ABSTRACT

There is disclosed a personal access device (PAD) capable of browsing web sites on an Internet protocol (IP) network and also capable of operating as a cordless phone that provides a conventional phone connection or a voice-over-IP phone connection. The personal access device comprises: 1) a radio frequency (RF) transceiver for wirelessly communicating with a base station coupled to the IP network, wherein the RF transceiver transmits IP data packets to the base station and receives IP data packets from the base station; and 2) a PAD controller for executing an Internet browser application and displaying web pages associated with the web sites on a display screen of the personal access device. The PAD controller is also capable of transmitting voice data to, and receiving voice data from, the base station via the RF transceiver.

24 Claims, 3 Drawing Sheets

PORTABLE INTERNET BROWSER DEVICE WITH CORDLESS PHONE MODULE AND METHOD OF OPERATION

TECHNICAL FIELD OF THE INVENTION

The present invention is generally directed to handheld computers and similar personal digital assistant (PDA) devices and, more specifically, to a portable Internet browser device that incorporates a cordless phone module.

BACKGROUND OF THE INVENTION

The personal computer (PC) has become ubiquitous in society. Personal computers are used in the home and in the office for a variety of purposes, one of the most important of which is accessing the Internet. A personal computer may be used to browse web sites and to send and to receive e-mail. The average price of a personal computer has fallen to the point where it is affordable to most of the population, which further increases the importance of Internet applications.

Despite the popularity of the personal computer, it is expected that future Internet development will focus on non-PC devices that are capable of accessing the Internet. These "web-enabled" devices include many conventional appliances (e.g., stereos, refrigerators, and the like) that may access the Internet for any number of purposes, such as notifying the manufacturer of a malfunction, downloading a software upgrade from the manufacturer, transmitting owner warranty information to the manufacturer, and the like. Internet telephones may eventually replace conventional telephones as "voice-over-IP" technology becomes more fully developed.

Consumers will use a variety of different devices to surf the web. Browser capability is being added to mobile phones, personal digital assistant (PDA) devices and electronic organizers, such as the Palm VII organizer, televisions, and the like. More recently, web-enabled personal access devices (PADs) have become available. These PADS are tablet-sized "web terminals" that resemble stripped-down laptop personal computers. The PAD executes selected Internet-related applications, including a browser program and an e-mail program. The PAD user interface typically is an LCD touch screen, a mouse-like pointing device (e.g., a scroll pad), and a software keyboard operated by the touch screen. The PAD may communicate by wireline or wirelessly with the Internet. In a wireless environment, the PAD communicates wirelessly with a base station that is connected by wireline to the public switched telephone network or to a proprietary local area network (LAN). A wireless PAD allows the user to move around the home or office while browsing the Internet. The base sation may be incorporated in a cradle that normally holds and recharges the PAD when it is not in use. An example of a web-enabled personal access device (PAD) is the Geode™ WebPAD™ system from National Semiconductor Corporation.

While the different types of web-enabled devices are intended to offer cheaper, more user-friendly access to the Internet than a conventional personal computer, many cost savings are not realized because of the redundancy in hardware or software functions of these web-enabled devices. For example, a PAD such as the Geode™ WebPAD™ system and a Palm VII organizer both contain an LCD screen and a wireless transceiver. Additionally, much of the software in these devices also is redundant. Moreover, PADs and electronic organizers do not provide the functionality of a telephone, so that a consumer must still own a separate Internet telephone in order to use the Internet for phone service. This further adds to the consumer's equipment costs.

There is therefore a need in the art for improved web-enabled devices that allow a user to access the Internet for a wide variety of applications. In particular, there is a need for a web-enabled personal access device (PAD) that is capable of browsing Internet web sites and capable of operating as an Internet telephone.

SUMMARY OF THE INVENTION

To address the above-discussed deficiencies of the prior art, it is a primary object of the present invention to provide a personal access device (PAD) capable of browsing web sites on an Internet protocol (IP) network and also capable of operating as a cordless phone that provides a conventional phone connection and a voice-over-IP phone connection. According to an advantageous embodiment of the present invention, the personal access device comprises: 1) a radio frequency (RF) transceiver capable of wirelessly communicating with a base station coupled to the IP network, wherein the RF transceiver transmits IP data packets to the base station and receives IP data packets from the base station; and 2) a PAD controller capable of executing an Internet browser application and displaying web pages associated with the web sites on a display screen of the personal access device, wherein the PAD controller is further capable of transmitting voice data to, and receiving voice data from, the base station via the RF transceiver.

According to one embodiment of the present invention, the PAD controller transmits the voice data to, and receives the voice data from, the base station in Internet protocol (IP) data packets.

According to another embodiment of the present invention, the PAD controller and the base station establish a low latency connection for transmitting and receiving the IP data packets containing the voice data.

According to still another embodiment of the present invention, the PAD controller executes a voice-over-IP application capable of transmitting and receiving the IP data packets.

In one embodiment of the present invention, the personal access device further comprises a microphone for detecting the voice of a user and a speaker for transmitting an incoming voice signal to the user.

In another embodiment of the present invention, the personal access device comprises a display screen module capable of housing the display screen and a user control module removably attached to the display screen module, wherein the RF transceiver and the PAD controller are disposed in the user control module.

In still another embodiment of the present invention, the microphone and the speaker are disposed in the user control module.

In yet another embodiment of the present invention, the PAD controller is capable of determining when the user control module and the display screen module are separated.

In a further embodiment of the present invention, the PAD controller, in response to a determination that the user control module and the display screen module are separated, establishes a low latency connection to the base station for transmitting and receiving the voice data.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OR THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged web-enabled personal access device (PAD).

Figure 1:
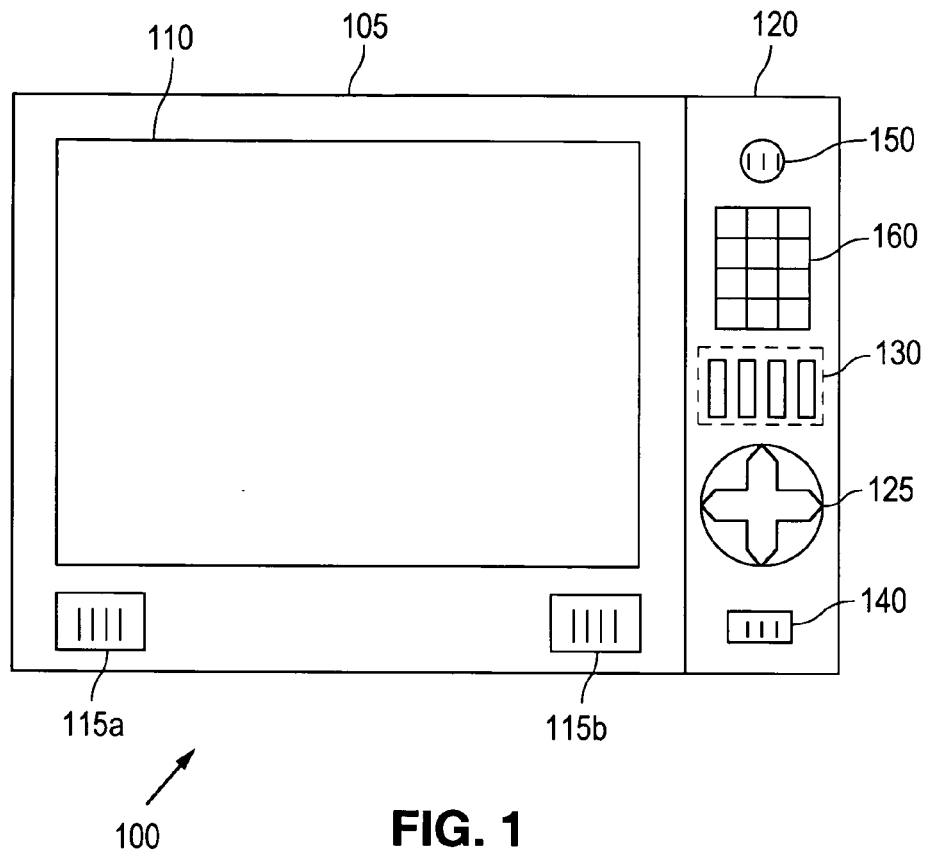
FIG. 1 illustrates an exemplary modular personal access device (PAD) according to one embodiment of the present invention.

FIG. 1 illustrates exemplary modular personal access device (PAD) 100 according to one embodiment of the present invention. PAD 100 comprises display module 105 and user control module 120. Display module 105 comprises display screen 110 and speakers 115a and 115b. Internally, user control module 120 comprises the necessary data processors and memory necessary to run applications (e.g., browser and e-mail) that access the Internet. As will be explained below in greater detail, user control module 120 also comprises wireless transceiver circuitry that provides PAD 100 with an Internet cordless phone capability.

User control module 120 comprises pointing device 125, which may be, for example, a mouse-type device or touch pad that enables a user to move a cursor on display screen 110. User control module 120 also comprises a plurality of control buttons 130 (generally denoted by dotted line), microphone 140, speaker 150 and (optional) telephone keypad 160. Control buttons 130 may include, among others, the following keys or buttons: ENTER, VOLUME UP/DOWN, Right Mouse, Left Mouse, UP/DOWN arrows, LEFT/RIGHT arrows, END, DELETE, ESC, TAB, and the like. A user browses the Internet and executes applications by maneuvering pointing device 125 and pressing control buttons 130. The user also may enter alphanumeric characters on telephone keypad 160. In an advantageous embodiment of the present invention, display screen 110 is a touch screen that allows the user to enter alphanumeric text by touching virtual buttons on an on-screen QWERTY keyboard.

Figure 2:
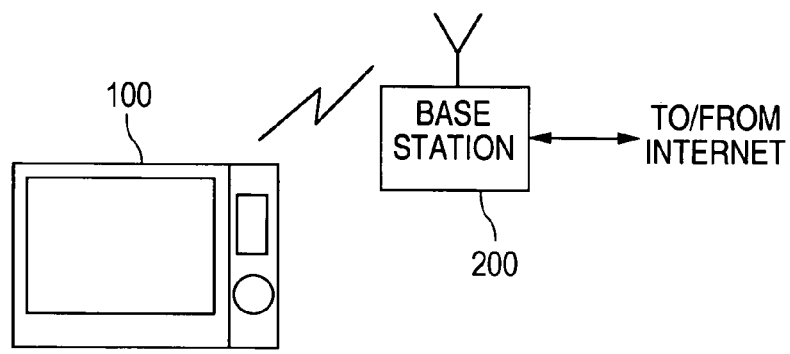
FIG. 2 illustrates an Internet set-up connection of the exemplary modular PAD in FIG. 1 and a corresponding base station according to one embodiment of the present invention.

FIG. 2 illustrates an Internet set-up connection of exemplary modular PAD 100 and corresponding base station 200 according to one embodiment of the present invention. Base station 200 may be connected to the Internet by any known technique, including by cable modem, by digital subscriber line (DSL), by conventional 56K analog modem to the public switched telephone system (PSTN), by fixed wireless connection, and the like. In an advantageous embodiment of the present invention, base station 200 comprises recharging circuitry and a holding cradle, allowing PAD 100 to be recharged when not in use.

When a user is browsing the Internet, PAD 100 wirelessly transmits Internet protocol (IP) packets to base station 200 and receives IP packets from base station 200. PAD 100 and base station 200 may communicate using any conventional radio frequency (RF) access protocol, including one or more of code division multiple access (CDMA), frequency division multiple access (FDMA), and time division multiple access (TDMA), or any combination of such protocols.

A conventional cordless phone comprises a handset and a base station, both of which contain RF transceivers that communicate voice signals wirelessly, thereby permitting a person to move freely around the home or office. Advantageously, the RF transceiver circuitry found in PAD 100 and base station 200 are similar to the RF transceiver circuitry found in the handset and base station of a cordless phone. The present invention capitalizes on these similarities by allowing a person to make and to receive telephone calls via user control module 120, which functions as a cordless phone handset.

A user may initiate a telephone call by entering a number on (optional) telephone keypad 160. If telephone keypad 160 is not implemented in user control module 120, the user may enter the number using the touch screen capability of display screen 110. In an advantageous embodiment of the present invention, when the user has entered the number, the call may be initiated by separating user control module 120 from display module 105. When user control module 120 detects that it has been detached from display module 105, user control module 120 stops operating in a web browser mode and begins operating in a cordless phone mode. The entered number is dialed out to the PSTN by base station 200. Alternatively, in a voice over IP application, base station 200 initiates a phone call via the Internet to the PSTN.

Similarly, a call may be answered when base station 100 transmits a call notification message to PAD 100. When user control module 120 detects the call notification message, an audible indicator (e.g., ring tone) or a visible indicator (e.g., message box) alerts the user, who may answer the call by separating user control module 120 from display module 105. Again, when user control module 120 detects that it has been detached from display module 105, user control module 120 stops operating in a web browser mode and begins operating in a cordless phone mode. When user control module 120 is being used in cordless phone mode, microphone 140 detects the user's voice and speaker 150 plays the incoming voice signal to the user.

Figure 3:
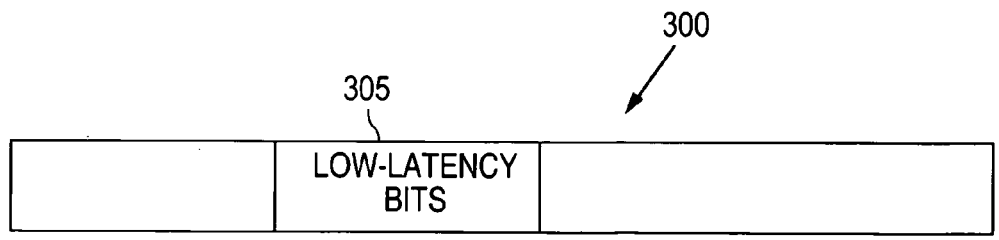
FIG. 3 illustrates an exemplary IP packet transmitted from the user control module to the base station according to one embodiment of the present invention.

FIG. 3 illustrates exemplary IP packet 300 transmitted from user control module 120 to base station 200 according to one embodiment of the present invention. When a user is browsing the Internet, IP packets are transmitted and received by PAD 100 and base station 200 in "non-real" time. That is, there is neither a guaranteed maximum delay for IP packets nor a minimum transfer rate. If a web site visited by a user is busy, IP packets may be received by PAD 100 at a very slow rate and with a large delay. If errors occur during transmission of IP packets from base station 200 to PAD 100, the corrupted IP packets are normally re-transmitted, adding additional delay.

While high latency may be acceptable for most web browsing functions, a voice-over-IP telephony application requires real-time delivery of IP packets containing voice data. Therefore, when user control module 120 is being used as a cordless phone, IP packets must be exchanged with base station 200 at a guaranteed minimum bit rate and with a fixed maximum latency. In one embodiment of the present invention, when user control module 120 is separated from display module 105, user control module 120 transmits special purpose IP packet 300 to base station 200 to establish a voice telephony connection. IP protocol defines a Type-of-Service (TOS) field that contains a Minimize Delay flag. The Minimize Delay flag is used by routers and other devices to give priority to IP packets in which the Minimize Delay flag is set. In FIG. 3, the TOS field is represented by low-latency bits 305, which may be used to minimize latency between user control module 120 and base station 200. The voice-over-IP telephony application sets the Minimize Delay flag in low-latency bits 305 in order to give priority to voice packets between user control module 120 and the Internet. Corrupted voice IP packets may be discarded thereafter. However, this is acceptable in a voice signal, since corrupted IP packets only result in a very brief amount of static or in tolerable voice distortion.

Figure 4:
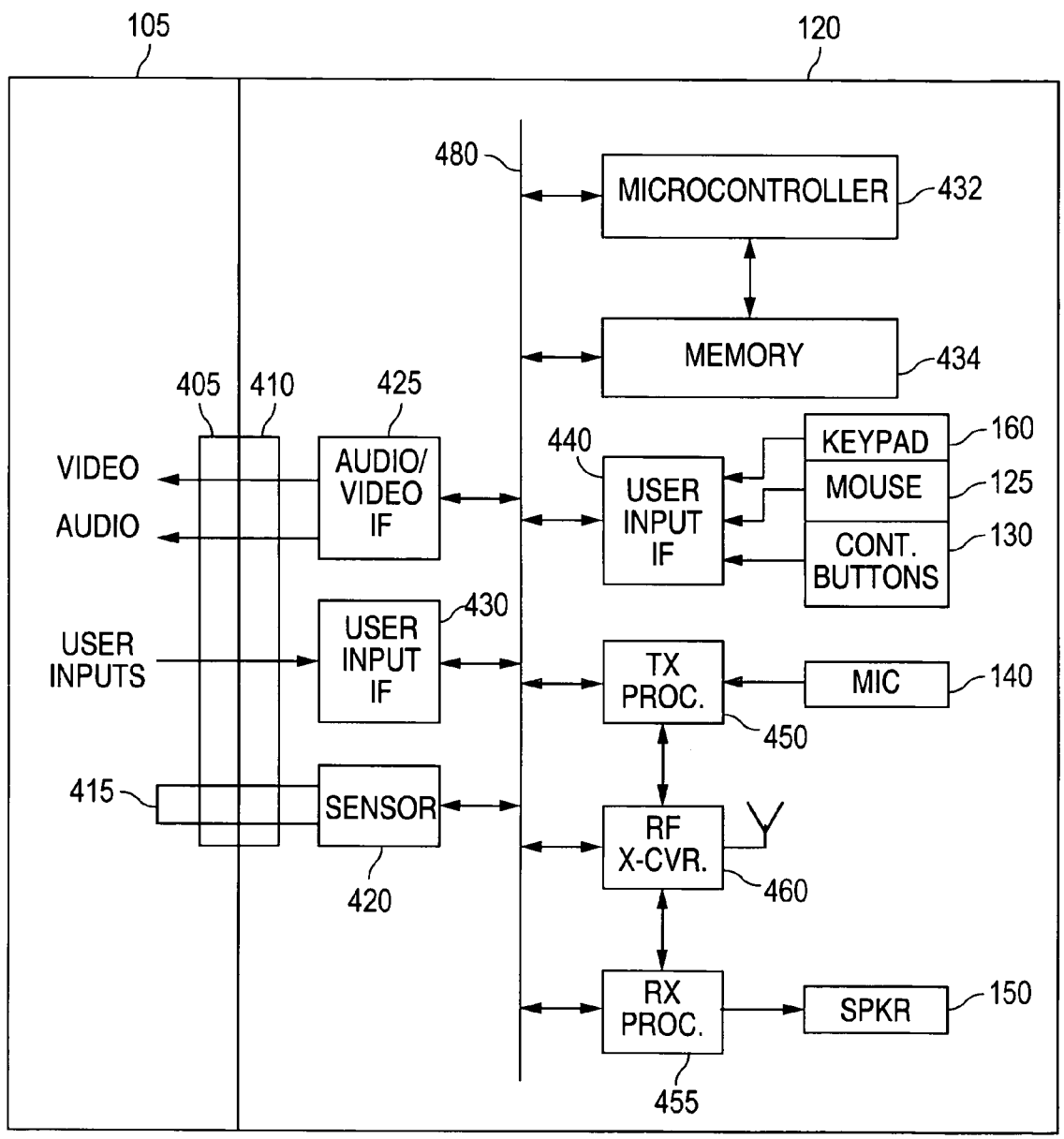
FIG. 4 illustrates an exemplary modular PAD in greater detail according to one embodiment of the present invention.

FIG. 4 illustrates in greater detail selected portions of display module 105 and user control module 120 in exemplary modular PAD 100 according to one embodiment of the present invention. Display module 105 comprises interface connector 405 that mates with interface connector 410 in user control module 120. When display module 105 and user control module 120 are connected, an electrical short created by jumper 415 between pins in interface connector 405 is detected by sensor 420 in user control module 120. When display module 105 and user control module 120 are disconnected, sensor 420 detects an open-circuit condition instead. Sensor 420 generates an output signal that indicates whether or not user control module 120 and display module 105 are connected.

User control module 120 comprises sensor 420, audio-video interface (IF) 425, user input IF 430, microcontroller 432, memory 434, user input IF 440, transmission processing circuitry 450, receiver processing circuitry 455, radio frequency (RF) transceiver (X-CVR) 460, all of which are coupled together by, and communicate via, communication bus 480. When a user is browsing the Internet, microcontroller 432 transmits video and audio signals associated with the web browser application to display module 105 via audio-video IF 425. Similarly, user inputs from the touch screen are transmitted from display screen 110 to microcontroller 432 via user input IF 430.

Memory 434 stores application programs executed by microcontroller 432 and data used by the application programs. Memory 432 may be any conventional memory, including static random access memory (RAM), dynamic RAM, and flash RAM. Microcontroller 432 may include any conventional data processor, including an x86-based microprocessor. User input IF 440 receives user manual inputs from optional telephone keypad 160, pointing device (mouse) 125, and control buttons 130.

Transmission processing circuitry 450 comprises a voice processor, such as a digital signal processor (DSP), capable of receiving an analog voice signal from microphone (MIC) 140 and converting it to a sequence of IP data packets containing digital voice data. These functions may also be accomplished by a microprocessor using medium access control (MAC) protocol. Receiver processing circuitry 455 comprises a voice processor (e.g., a DSP) capable of receiving a sequence of IP data packets containing digital voice data and converting the digital voice data to an analog voice signal that is transmitted to speaker (SPKR) 150.

During a voice-over-IP telephony application, radio frequency (RF) transceiver 460 receives IP packets containing voice data as a baseband signal from transmission processing circuitry 450. RF transceiver 460 then modulates the baseband signal to an RF signal that is transmitted to base station 200. RF transceiver 460 receives incoming RF signals from base station 200 and demodulates the incoming RF signal to a baseband signal comprising IP packets containing voice data. The IP packets are sent to receiver processing circuitry 455 and speaker 150.

During an Internet browser application, RF transceiver 460 demodulates IP packets received from base station 200 and transmits the IP packets to microcontroller 432. Microcontroller 432 extracts web page data associated with the browser application from the IP packets and transmits it to display module 105 via audio-video IF 425. Similarly, microcontroller 432 may receive user input data and commands associated with the browser application from user input IF 440 (e.g., keypad inputs, mouse inputs) or from user input IF 430 (e.g., touch screen inputs). Microcontroller then converts the user input data and commands to IP packet format and transmits the IP packets as a baseband signal to RF transceiver 460. RF transceiver 460 modulates the IP packets to produce an RF signal that is transmitted to base station 200.

Figure 5:
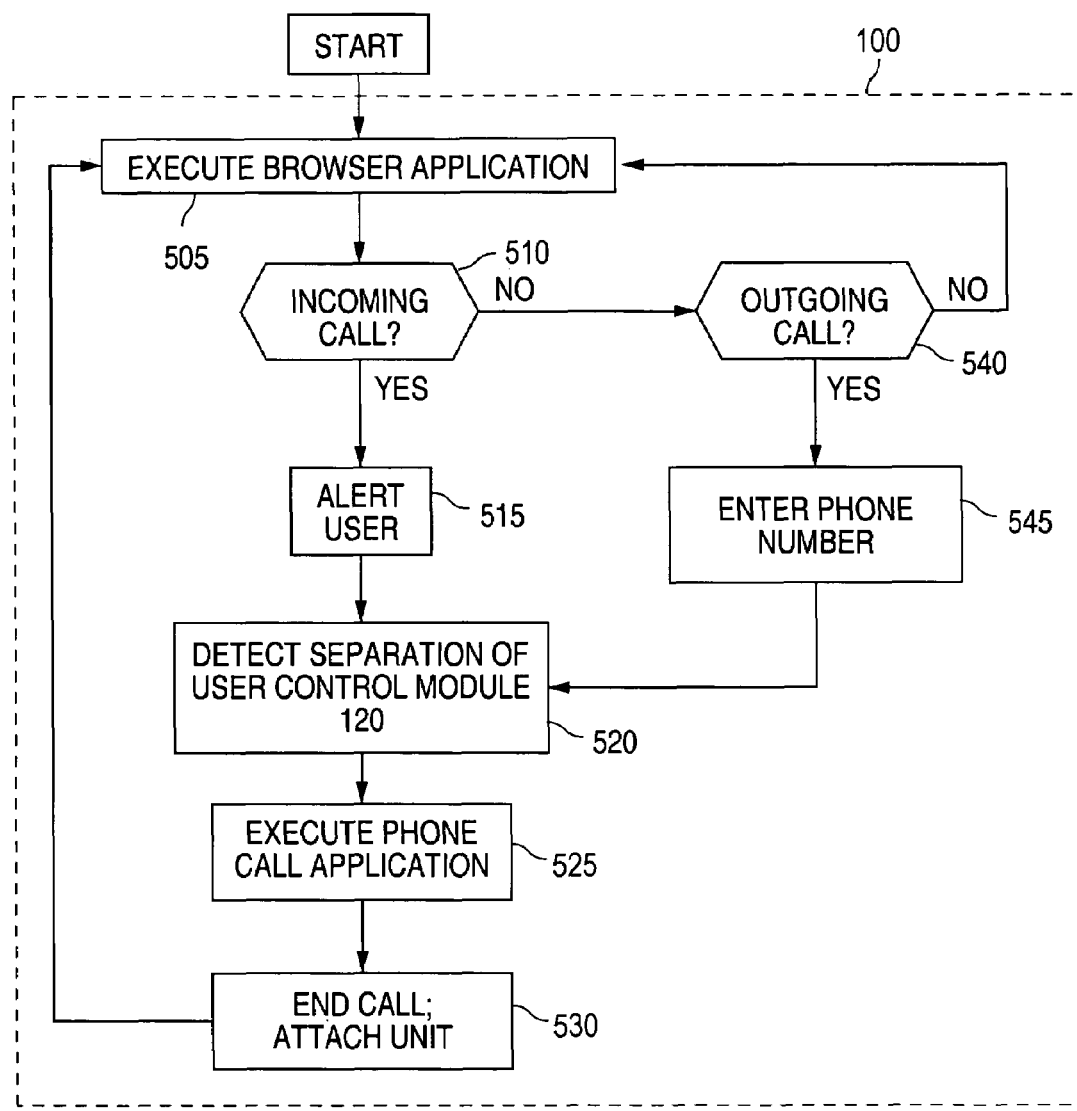
FIG. 5 is a flow diagram illustrating the operation of the exemplary modular PAD according to one embodiment of the present invention.

FIG. 5 depicts flow diagram 500, which illustrates the operation of exemplary modular PAD 100 according to one embodiment of the present invention. Initially, user control module 210 and display module 105 are connected together and PAD 100 executes a browser application under the control of user inputs (process step 505). As the browser application is executed, microcontroller 432 continually monitors incoming IP packets from RF transceiver 460 to determine if base station 200 has transmitted a signal indicating that an incoming phone call is being received (process step 510). Microcontroller 432 also monitors user inputs from user input IF 430 and/or user input IF 440 to determine if the user is launching a phone call application that initiates an outgoing call (process step 540).

If a message from base station 200 indicates that an incoming call is being received, microcontroller 432 alerts the user by means of an audible indicator (e.g., a ringing tone) and/or a visual indicator (e.g., a dialog box on display screen 110) (process step 515). To answer the call, the user may launch the phone call application by separating user control module from display module 105, an action that is detected by sensor 420. Sensor 420 then notifies microcontroller 432 of the separation (process step 520). Next, microcontroller 432 transmits special purpose IP packet 300 to base station 200 to establish a low latency voice telephony connection between base station 200 and user control module 120. Microcontroller 432 then executes the phone call application and user control module 120 functions as a cordless phone (process step 525). At some point the user ends the call, such as by pressing a "Hang Up" button on control buttons 130, and reattaches user control module 120 to display module 105 (process step 530). At that point, microcontroller 432 may resume executing the browser application from the same point where the incoming call was received.

If the user launches the phone call application in order to make an outgoing call, microcontroller 432 prompts the user to enter the phone number on display screen 110 or keypad 160 (process step 545). Once the number is entered, the user may cause the number to be dialed by separating user control module from display module 105, an action that is detected by sensor 420. Sensor 420 then notifies microcontroller 432 of the separation (process step 520). Next, microcontroller 432 transmits special purpose IP packet 300 to base station 200 to establish a low latency voice telephony connection between base station 200 and user control module 120. Microcontroller 432 then transmits the dialed number to base station 200 and continues to execute the phone call application. User control module 120 then functions as a cordless phone (process step 525). As before the user may end the call by pressing a "Hang Up" button on control buttons 130 and reattaching user control module 120 to display module 105 (process step 530). Microcontroller 432 then resumes executing the browser application from the same point where the user initiated the outgoing call.

In an alternate embodiment of PAD 100, user control module 120 and display module 105 may be a single integral unit, rather than separate units. In such an embodiment, PAD 100 operates as a cordless speaker phone, rather than as a cordless phone handset. When the user dials a phone number or an incoming call is received, the launching of the phone application automatically causes the transmission of special purpose IP packet 300 to base station 200, thereby establishing a low latency voice telephony connection between base station 200 and PAD 100. Thereafter, the user simply speaks out loud and uses PAD 100 in speaker phone mode. Advantageously, if PAD 100 is a single integral unit, telephone keypad 160 may be omitted, since all manual user inputs may be received from a touch screen on display 110.

In an alternate embodiment of PAD 100, user control module 120 may operate as a conventional cordless phone over the public switched telephone network (PSTN), rather than as an Internet telephone executing a voice-over-IP application. This may be accomplished by connecting base station 200 to the PSTN as well as to the Internet. When an incoming call is received or the user dials a phone number, user control module 120 ceases execution of the browser application and base station 200 establishes a conventional call connection ot the central office of the PSTN. Thereafter, user control module 120 and base station 200 may exchange voice data according to any conventional protocol, not necessarily in the form of IP data packets.

Although the present invention has been described in detail, those skilled in the art will understand that they can make various changes, substitutions and alterations without departing from the spirit and scope of the invention in its broadest form.

What is claimed is:

1. A portable device comprising:
a display screen module comprising a display screen; and
a user control module removably attached to the display screen module and comprising:
a transceiver to wirelessly communicate with a base station coupled to a network; and
a controller to:
execute an Internet browser application so as to display web page content on the display screen of the display screen module;
communicate voice data with the base station via the transceiver; and
communicate a special purpose packet to the base station via the transceiver in response to a determination that the display screen module and the user control module are separated so as to establish a low-latency connection for communicating packetized voice data, the special purpose packet including an indicator that the base station is to give priority to packets having voice data communicated between the base station and the portable device.

2. The portable device as in claim 1, wherein the voice data is communicated between the transceiver and the base station as one or more Internet Protocol (IP) data packets.

3. The portable device as in claim 2, wherein the controller and the base station establish a low latency connection for communicating the one or more IP data packets containing the voice data.

4. The portable device as in claim 3, wherein the controller executes a voice-over-IP (VoIP) application to communicate the one or more IP data packets.

5. The portable device as in claim 1, wherein the user control module further comprises a microphone for detecting the voice of a user and a speaker for transmitting an incoming voice signal to the user.

6. The portable device as in claim 1, wherein the controller, in response to a determination that the user control module and the display screen module are separated, initiates a low latency connection with the base station for communicating voice data.

7. The portable device as in claim 6, wherein the controller, in response to the determination that the user control module and the display screen module are separated, ceases the execution of the Internet browser application.

8. The portable device as in claim 7, wherein the controller, in response to a determination that the user control module and the display screen module are reattached, resumes the execution of the Internet browser application.

9. The portable device as in claim 1, wherein at least a portion of the web page content is provided to the Internet browser application from the network via the base station.

10. A system comprising:
a base station coupled to a network; and
a portable device comprising:
  a display screen module comprising a display screen; and
  a user control module removably attached to the display screen module and comprising:
    a transceiver to wirelessly communicate with the base station; and
    a controller to:
      execute an Internet browser application so as to display web page content on the display screen of the display screen module;
      communicate voice data with the base station via the transceiver; and
      communicate a special purpose packet to the base station via the transceiver in response to a determination that the display screen module and the user control module are separated so as to establish a low-latency connection for communicating packetized voice data, the special purpose packet including an indicator that the base station is to give priority to packets having voice data communicated between the base station and the portable device.

11. The system as in claim 10, wherein the voice data is communicated between the transceiver and the base station as one or more Internet protocol (IP) data packets.

12. The system as in claim 11, wherein the controller and the base station establish a low latency connection for communicating the one or more IP data packets containing the voice data.

13. The system as in claim 12, wherein the controller executes a voice-over-IP (VoIP) application to communicate the one or more IP data packets.

14. The system as in claim 10, wherein the user control module further comprises a microphone for detecting the voice of a user and a speaker for transmitting an incoming voice signal to the user.

15. The system as in claim 10, wherein the controller, in response to a determination that the user control module and the display screen module are separated, initiates a low latency connection with the base station for communicating voice data.

16. The system as in claim 15, wherein the controller, in response to the determination that the user control module and the display screen module are separated, ceases the execution of the Internet browser application.

17. The system as in claim 16, wherein the controller, in response to a determination that the user control module and the display screen module are reattached, resumes the execution of the Internet browser application.

18. The system as in claim 10, wherein at least a portion of the web page content is provided to the Internet browser application from the network via the base station.

19. A method comprising:
displaying web page content on a display screen module of a portable device when the display screen module is attached to a user control module of the portable device; and
in response to a determination that the user control module and the display screen are separated:
  ceasing the display of web page content on the display screen;
  communicating voice data between a user of the portable device and a base station wirelessly coupled to the portable device; and
  communicating a special purpose packet to the base station via the transceiver in response to a determination that the display screen module and the user control module are separated so as to establish a low-latency connection for communicating packetized voice data, the special purpose packet including an indicator that the base station is to give priority to packets having voice data communicated between the base station and the portable device.

20. The method as in claim 19, further comprising:
in response to a determination that the user control module and the display screen are reattached:
  ceasing the communication of voice data; and
  resuming the display of web page content on the display screen module.

21. The method as in claim 19, further comprising:
initiating a low latency connection between the portable device and the base station for communicating one or more Internet Protocol (IP) data packets containing at least a portion of the voice data.

22. A portable device comprising:
a display screen module comprising a display screen; and
a user control module removably attached to the display screen module and comprising:
  a transceiver to wirelessly communicate with a base station coupled to a network;
  means for executing an Internet browser application so as to display web page content on the display screen of the display screen module;
  means for determining whether the display screen module and the user control module are attached; and
  means for communicating a special purpose packet to the base station via the transceiver in response to a determination that the display screen module and the user control module are separated so as to establish a low-latency connection for communicating packetized voice data, the special purpose packet including an indicator that the base station is to give priority to packets having voice data communicated between the base station and the portable device.

23. The portable device as in claim 22, wherein the user control module further comprises means for terminating the low-latency connection in response to a determination that the display screen module and the user control module are reattached.

24. The portable device as in claim 22, wherein the indicator includes a minimize delay flag.

* * * * *